United States Patent
Hufnagel

[11] Patent Number: 6,098,588
[45] Date of Patent: Aug. 8, 2000

[54] INJECTION DEVICE AND COMBUSTION PROCESS FOR AN INTERNAL COMBUSTION ENGINE

[75] Inventor: Peter Hufnagel, Griesbach, Germany

[73] Assignee: Motorenfabrik Hatz GmbH & Co. KG, Ruhstorf, Germany

[21] Appl. No.: 09/171,765

[22] PCT Filed: Feb. 20, 1998

[86] PCT No.: PCT/EP98/00989

§ 371 Date: Feb. 16, 1999

§ 102(e) Date: Feb. 16, 1999

[87] PCT Pub. No.: WO98/38418

PCT Pub. Date: Sep. 3, 1998

[30] Foreign Application Priority Data

Feb. 27, 1997 [DE] Germany ............ 197 07 873

[51] Int. Cl.⁷ .................................................. F02B 19/04
[52] U.S. Cl. ................ 123/261; 123/269; 123/275; 123/280; 123/286; 123/298
[58] Field of Search ................ 123/261, 262, 123/269, 273, 275, 276, 280, 285, 286, 298

[56] References Cited

U.S. PATENT DOCUMENTS

| 1,619,825 | 3/1927 | Lucke ........................ 123/280 |
| 3,253,584 | 5/1966 | Traub et al. ................ 123/280 |
| 3,738,332 | 6/1973 | Eyzat et al. ................ 123/275 |
| 4,627,405 | 12/1986 | Imhof et al. ............... 123/298 |
| 4,974,559 | 12/1990 | Nagaoka .................... 123/298 |
| 5,329,901 | 7/1994 | Onishi ....................... 123/298 |
| 5,392,744 | 2/1995 | Regueiro .................... 123/269 |
| 5,522,357 | 6/1996 | Nogi et al. .................. 123/261 |

FOREIGN PATENT DOCUMENTS

| 505 664 | of 0000 | Belgium . |
| 31 16 638 | 6/1982 | Germany . |
| 39 39 251 | 5/1991 | Germany . |
| 44 18 698 | 6/1995 | Germany . |
| 59-120715 | 7/1984 | Japan . |
| 3-264725 | 11/1991 | Japan . |
| 6-185365 | 7/1994 | Japan . |

*Primary Examiner*—Erick Solis
*Attorney, Agent, or Firm*—Helfgott & Karas, PC.

[57] ABSTRACT

An injection device for an internal combustion engine, especially a diesel engine, with a combustion chamber (16) for each defined by piston (2), cylinder and cylinder head (1), a multi-hole injection nozzle (5) and a shroud (3) projecting from the cylinder head (1) into the combustion chamber (16) and surrounding the nozzle (5) in such a way that a precombustion chamber is formed between shroud (3) and piston (2) at TDC, and a combustion process for an internal combustion engine, especially for a diesel engine, with an injection device as described hereinabove, wherein combined direct and swirl-chamber injection takes place in the vicinity of TDC.

6 Claims, 2 Drawing Sheets

INJECTION DEVICE AND COMBUSTION PROCESS FOR AN INTERNAL COMBUSTION ENGINE

The invention relates to an injection device for an internal combustion engine, especially a diesel engine, and to a combustion process using the injection device.

BACKGROUND OF THE INVENTION

In conventional diesel engines, a distinction is made between two main combustion processes: the side-chamber process and the direct-injection process.

In the side-chamber process, combustion is initiated in a side chamber located, for example, in the cylinder head. This so-called precombustion chamber or swirl chamber is in communication directly with the injection nozzle on one side and with the main combustion chamber on the other side. At the end of the compression stroke, fuel is injected into the side chamber and combustion is initiated in the side chamber first of all under $O_2$-deficient conditions, so that relatively low NOx concentrations are formed in this phase. Overflow of the combustion gases leads to a smooth pressure rise in the main combustion chamber. The associated low temperature level continues to limit NOx formation. In the swirl-chamber process, improved swirling compared with the pure precombustion chamber process is achieved by appropriate geometric configuration of the side chamber and overflow passage. In both combustion processes, inadequate mixture preparation can lead to relatively long ignition delays. The overall efficiency is lower than in the direct-injection process, and this causes greater fuel consumption and thus higher $CO_2$ emission.

In the direct-injection process, the fuel is introduced directly into the combustion chamber via the piston crown. Fuel atomization, heating, volatilization and mixing with the air must therefore take place in a short time sequence. In contrast to the side-chamber engine with its throttle-action pintle-type nozzle, which generates a fan of jets, multi-hole nozzles generating individual jets are used in the direct-injection process. Compared with the side-chamber combustion process, the fuel consumption is about 20% less. Because of the steep pressure increase, however, the disadvantage exists of intensive noise production and increased NOx emission. In addition, higher injection pressures are necessary, increasing the costs of the injection system. Deposits of fuel can form on the wall because of the short mixture formation time.

In a combustion chamber known from JP 3-264725 (A) for internal combustion engines, cylindrical shrouds projecting from the cylinder head and from the piston crown together form a precombustion chamber. At TDC they fit coaxially one inside the other, while part of the fuel injected into the precombustion chamber passes through orifices in the upper shroud and slits in the lower shroud into the combustion chamber. In this configuration combustion first takes place in the precombustion chamber where, by virtue of the long period of overlap between the two shrouds, it is maintained isolated from the combustion chamber until well into the expansion stroke. Only as the annular gap opens increasingly as the two shrouds move apart do the precombustion chamber gases spill over into the actual combustion chamber, thus resulting in high specific consumption.

DE 3805009 A1 describes a piston for a diesel engine with direct fuel injection, wherein the end face of the piston facing the combustion chamber and the cylinder head is provided at its center with a cylindrical cavity extending into the interior of the piston. This known direct-injection process operates with a single-jet nozzle, which at first injects exclusively into the cylindrical cavity. To improve the process, elongated recesses open to the combustion chamber are provided on the end face of the piston. At one of their ends these recesses open into the cylindrical cavity and at their other ends they are terminated at least at a small distance from the piston jacket. The purpose of such a configuration of the piston end face is to reduce the "pinking" or "knocking" of the diesel engine. The process described in DE 3805009 A1 suffers from disadvantages similar to those of the chamber process described hereinabove, especially heat losses at the chamber wall and cavity wall.

SUMMARY OF THE INVENTION

In contrast, the object of the present invention is to provide, for a diesel engine, an inexpensive injection device which leads, in connection with a corresponding combustion process, to lower pollutant emission without influencing the favorable overall efficiency of a direct-injection process.

This object is achieved by an injection device and a combustion process.

The injection device according to the invention is provided with a combustion chamber defined by piston, cylinder and cylinder head, an injection nozzle and a shroud projecting from the cylinder head into the combustion chamber and surrounding the nozzle. The shroud is open to the combustion chamber before TDC is reached; direct injection takes place at the end of the compression stroke. In the vicinity of TDC, there is formed between shroud and piston a precombustion chamber in which precombustion of a homogeneous mixture takes place under $O_2$-deficient conditions. By virtue of the small wall thickness of the shroud, heat losses to the material are small and largely equal temperature conditions prevail in precombustion chamber and main combustion chamber. Because of the combination of swirl chamber and direct injection, a smooth pressure rise associated with lowering of the NOx and HC emission is made possible without influencing the overall efficiency. By molding the shroud in one piece onto the cylinder head or by fixing a sleeve made from heat-resisting steel in the injection nozzle hole, an inexpensive injection device of the type according to the invention is created.

In this connection it is provided according to the invention that the injection nozzle is constructed as a multi-hole nozzle and that the shroud of the precombustion chamber is provided with orifices disposed in alignment with, or in other words facing the nozzle holes, the diameter of the orifice being chosen precisely such that part of the nozzle jet, namely the outer peripheral zones already comprising to a high extent almost homogeneous mixture portions, is held back inside the shroud, whereas the liquid core of the injection jet passes unhindered into the main combustion chamber. Hereby there is created advantageous charge stratification. The alignment of the nozzle holes with the orifices of the shroud can be achieved either by turning the nozzle or, when the shroud is mounted, by turning this toward the nozzle. In the injection phase, the peripheral zones of the injection jet, which are already provided to a high extent with almost homogeneous mixture portions, are ignited in an oxygen-deficient, largely enclosed partial volume prior to actual combustion. NOx formation in this phase is slight because of the scarcity of oxygen and the low temperatures, as is HC formation, because of the small ratio of wall surface to injected fuel volume.

An advantageous further embodiment of the present invention provides that the piston has a combustion-chamber well, wherein the precombustion chamber formed at TDC is defined on the one hand by the cylinder head and the shroud projecting therefrom and on the other hand by the piston in the region of the combustion-chamber well. Because of the precombustion chamber or swirl chamber formed in this way, preignition in the swirl chamber and subsequent overflow of the combustion gases into the main combustion chamber is achieved, leading to a substantially smoother pressure rise in the main combustion chamber and thus to lower temperature peaks. This in turn leads to lower NOx values.

Furthermore, an advantageous embodiment provides that the combustion-chamber well has at the center a camber of the crown, which in the vicinity of TDC is surrounded by the shroud and limits the precombustion chamber in one direction. Spiral recesses can also be disposed on the camber of the crown. Hereby the mixing of the combustion chamber mixture in the main combustion chamber is optimized and also deposits of fuel on the walls are flushed off again. Moreover, a smooth pressure rise is achieved with uniform intermixing in the main combustion chamber. At the same time, optimization of the angle between the shot, or in other words the combustion gas emerging from the swirl chamber into the main combustion chamber, and well swirl angle is possible.

Finally, an advantageous further embodiment of the present invention provides that the shroud tapers in the manner of a truncated cone toward the piston. Hereby uniform combustion is promoted. By appropriate choice of cone angle, the axes of the nozzle jets are disposed perpendicular to the shroud.

In a combustion process with an injection device described hereinabove, combined direct and swirl-chamber injection takes place in the vicinity of TDC. For the present purpose, the abbreviation TDC logically designates the region included from just before to just after top dead center of the piston. By this process there is achieved the overall efficiency of direct injection, while lowering of the NOx, CO and HC emissions is achieved by virtue of the charge stratification.

It is further advantageous that, at the beginning of the working stroke, preignition occurs at first in the precombustion chamber and the combustion gases overflow into the main combustion chamber via a gap formed between shroud and piston. This leads to a smooth pressure rise in the main combustion chamber, thus preventing "knocking" and "pinking".

Further advantages and structural features will be described by means of the following practical example with reference to the attached drawing, wherein:

DETAILED DESCRIPTION OF THE INVENTION

Figure 1:
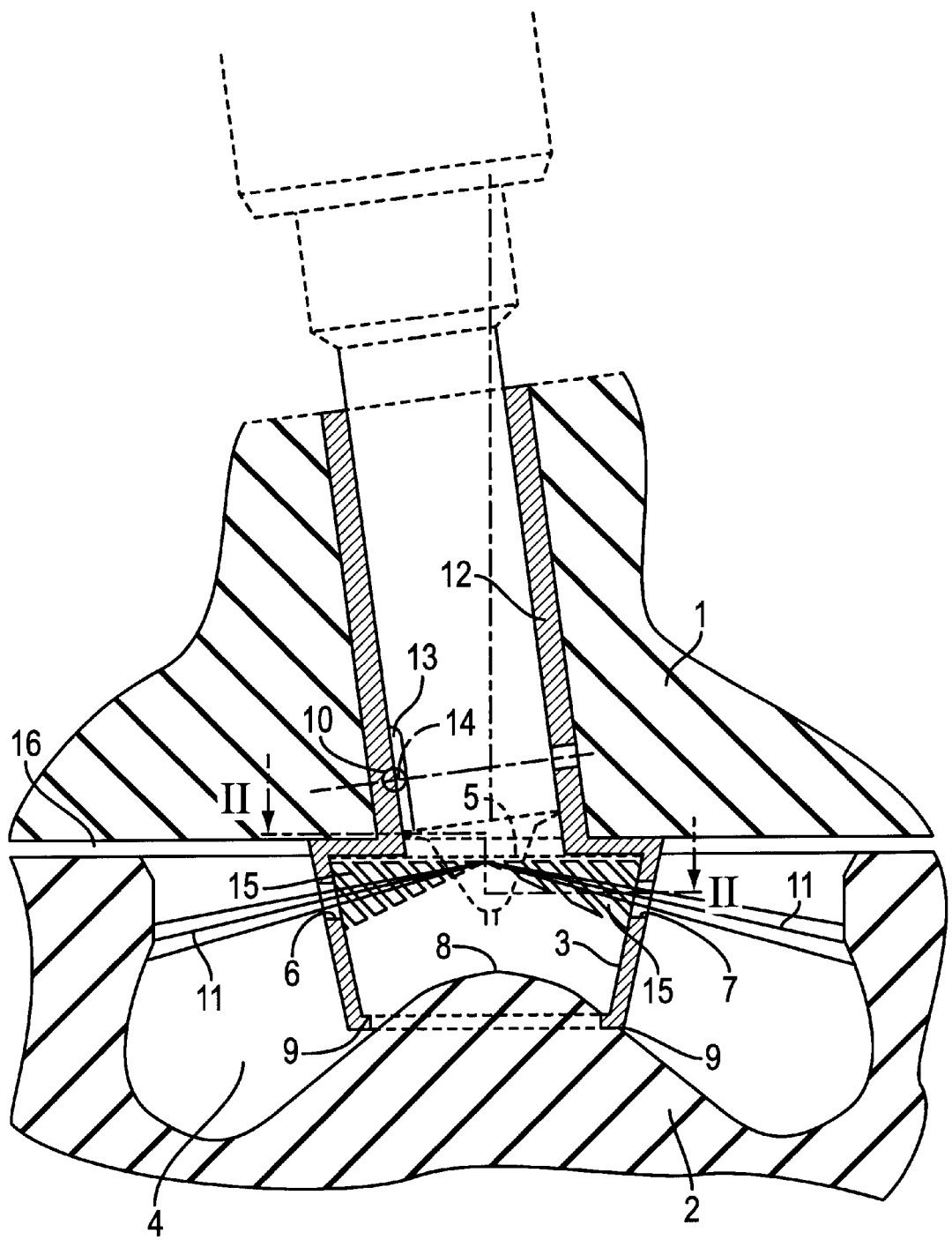
FIG. 1 shows an injection device according to the present invention in installed condition.

FIG. 1 shows a section through a cylinder head 1 and a piston 2, the piston 2 being located at TDC. A multi-hole injection nozzle 5, shown as a broken line, is mounted approximately perpendicularly in cylinder head 1. The angle of multi-hole injection nozzle 5 is adjusted such that the nozzle holes are disposed opposite the openings 6, 7 of the shroud 3, which has the shape of a truncated cone. Shroud 3 projects into the combustion-chamber well 4 of piston 2 in such a way that a gap 9 is formed between camber 8 of the combustion-chamber well and shroud 3. The gap size is only a few tenths of one millimeter. The shroud, made from heat-resisting steel, is held on a sleeve 12, the angle of which is adjustable between injection nozzle 5 and cylinder head 1. For simpler mounting, the nozzle is provided with a centering device 10 comprising a slot 13 and a ball 14, which snaps into a cone on the inside wall of the sleeve. In this way it is possible to align the nozzle holes opposite the orifices of the shroud without removing the cylinder head. The symbolically represented core jet 11 of nozzle 5 passes through the orifices 6, 7, whereas the peripheral zone of the nozzle jet 15 is held back by the shroud 3. In this case the nozzle jet has a spread angle of about 24°.

Figure 2:
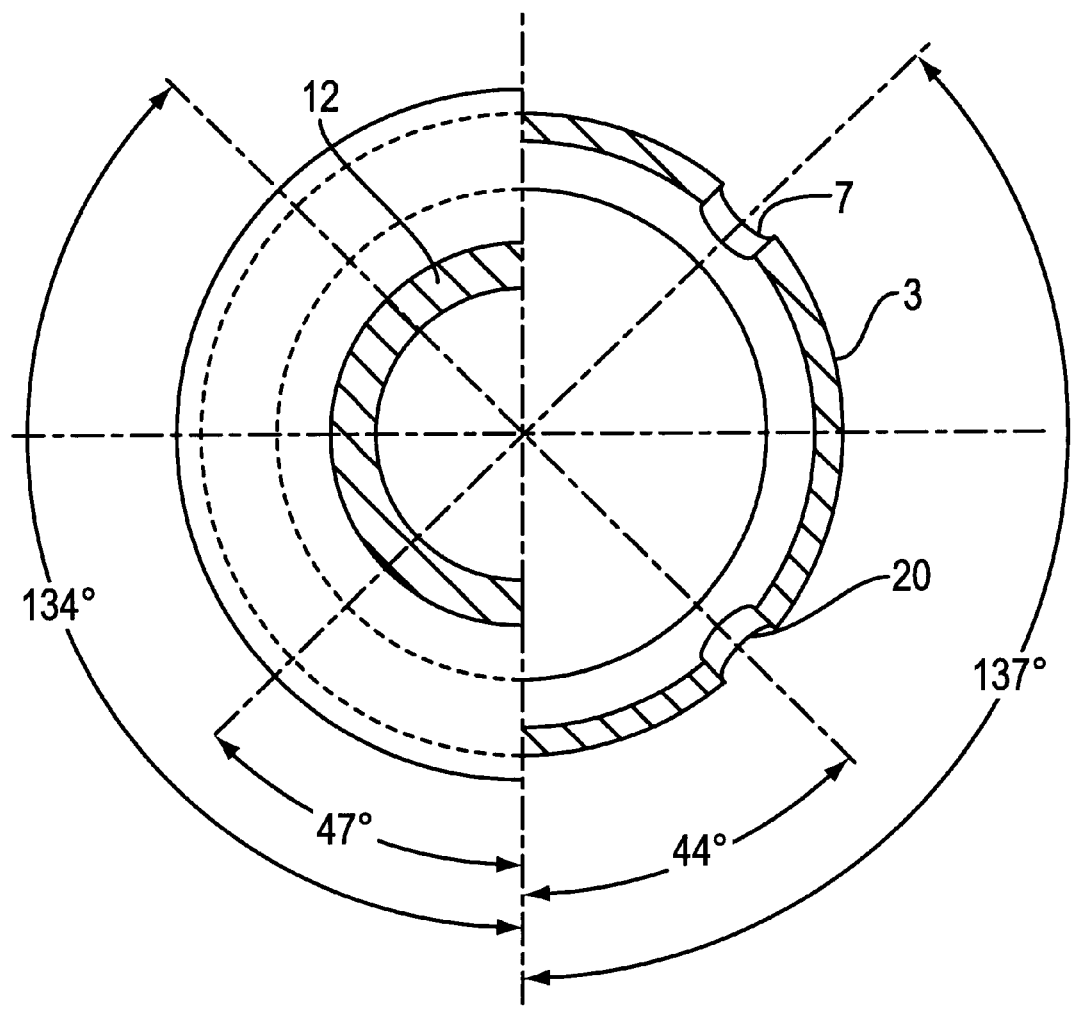
FIG. 2 shows a section along the line II—II from FIG. 1.

FIG. 2 shows a section along the section line II—II from FIG. 1, in which the orifices 7 and 20 of the shroud are illustrated, said orifices being disposed opposite the injection holes of the multi-hole injection nozzle. During each injection process, the core jet passes through orifice 7, 20 of shroud 3 and reaches main combustion chamber 16 (FIG. 1). Only the peripheral zone of the jet is held back by the shroud and at TDC ignited inside the precombustion chamber formed by shroud 3. The combustion gases flowing out through gap 9 and combustion-chamber well 4 become mixed with the combustion taking place with a time delay in main combustion chamber 16. At the same time, the combustion gases emerging from the precombustion chamber have a swirl, which favors thorough intermixing of the main combustion chamber 16 and prevents deposits of fuel on the wall.

What is claimed is:

1. An injection device for an internal combustion engine, defined by a piston (2), a cylinder and a cylinder head (1), a multi-hole injection nozzle (5) and a shroud (3) projecting from the cylinder head into the combustion chamber (16), surrounding the nozzle (5) and defining a procombustion chamber in which precombustion takes place, the shroud (3) provided with orifices (6, 7, 20) in the combustion chamber, wherein the shroud (3) at TDC defines together with the piston crown the precombustion chamber, and there is formed between shroud (3) and a camber (8) of the combustion-chamber well (4) a gap (9), through which combustion gases pass into the main combustion chamber (16) during precombustion, the diameter of the orifices (6,7,20) being chosen precisely such that a peripheral zone of each nozzle jet (15) is held back inside the shroud (3).

2. An injection device according to claim 1, wherein the combustion-chamber well (4) is in the piston (2), in which the shroud projects in such a way that the precombustion chamber formed at TDC is defined on a first side by the cylinder head (1) and on a second side by the shroud (3) projecting therefrom and the piston is in the region of the combustion-chamber well (4).

3. An injection device according to claim 1, wherein the combustion-chamber well (4) has at the center the camber (8) of the crown, which in the vicinity of TDC is surrounded by the shroud (3) and limits the precombusiton chamber in one direction.

4. An injection device according to claim 1, wherein the shroud (3) tapers in the manner of a truncated cone toward the piston.

5. An injection device according to claim 1, wherein combined direct and swirl-chamber injection takes place in the vicinity of TDC.

6. An injection device according to claim 5, wherein at the beginning of the working stroke, preignition occurs at first in the precombustion chamber and the combustion gases pass into the main combustion chamber via the gap formed between shroud and piston.

* * * * *